United States Patent [19]

Murphy et al.

[11] Patent Number: 6,044,328
[45] Date of Patent: *Mar. 28, 2000

[54] METHOD FOR CREATING, TESTING, AND MODIFYING GEOLOGICAL SUBSURFACE MODELS

[75] Inventors: William F. Murphy, Redding; Andrew J. Reischer, Ridgefield; John J. Orrange, Ridgefield; Ian D. Bryant, Ridgefield; Allison M. Fazio, Fairfield, all of Conn.

[73] Assignee: Schlumberger Technology Corporation, Ridgefield, Conn.

[ * ] Notice: This patent is subject to a terminal disclaimer.

[21] Appl. No.: 08/980,956

[22] Filed: Dec. 1, 1997

[51] Int. Cl.[7] .................................................. G06F 19/00
[52] U.S. Cl. ................................................................ 702/11
[58] Field of Search ................................ 702/11, 12, 13, 702/16; 706/929

[56] References Cited

U.S. PATENT DOCUMENTS

| | | | |
|---|---|---|---|
| 4,313,164 | 1/1982 | Regat | 702/11 |
| 4,340,934 | 7/1982 | Segesman | 702/11 |
| 4,646,240 | 2/1987 | Serra et al. | 364/422 |
| 4,648,268 | 3/1987 | Grosjean | 73/152 |
| 4,937,747 | 6/1990 | Koller | 364/422 |
| 4,991,095 | 2/1991 | Swanson | 364/421 |
| 5,012,675 | 5/1991 | Koller et al. | 73/432.1 |
| 5,321,612 | 6/1994 | Stewart | 702/13 |
| 5,646,342 | 7/1997 | Hagenes | 702/13 |
| 5,671,136 | 9/1997 | Willhoit, Jr. | 364/421 |
| 5,671,344 | 9/1997 | Stark | 395/119 |
| 5,835,882 | 11/1998 | Vienot et al. | 702/13 |
| 5,894,417 | 4/1999 | Dorn | 702/16 |

OTHER PUBLICATIONS

O. Serra, Sedimentary Environments from Wireline Logs, Schlumberger Technical Services Publication No. M–081030/SMP–7008 (1985).

T. Dreyer, Geometry and Facies of Large–Scale Flow Units in Fluvial–Dominated Fan–Delta–Front Sequences, Ashton, M. (ed.), 1993, *Advances in Reservoir Geology*, Geological Society Special Publication No. 69, pp. 135–174.

I. D. Bryant and S. S. Flint, Quantitative Elastic Reservoir Geological Modelling: Problems and Perspectives, in S. S. Flint and I. D. Bryant (Eds.), *Geological Modeling of Hydrocarbon Reservoirs and Outcrop Analogues*, International Association of Sedimentologists Special Publication 15 (1993), 3–20.

J. Alexander, A Discussion of the Use of Analogues for Reservoir Geology, M. Ashton (ed.), 1993, *Advances in Reservoir Geology*, Geological Society Special Publication No. 69, pp. 175–194.

Ferrier, G. et al., "An integrated GIS and knowledge–based system as an aid for the geological analysis of sedimentary basins", Int'l Journal Geographical Information Science, (Apr.–May 1997), Taylor & Francis, UK, vol. 11, No. 3, pp. 281–297, XP002098061.

"Joint UK Product Developing Basin Geology Modelling Tool", Offshore, vol. 53, No. 4, Apr. 1, 1993, pp. 86–87, XP000365016.

(List continued on next page.)

*Primary Examiner*—Donald E. McElheny, Jr.
*Attorney, Agent, or Firm*—William B. Batzer; David Garrod

[57] ABSTRACT

A computer implemented-method of creating subsurface models, including, for example, the steps of: selecting a region of the world to be modeled; providing geophysical and geographical data corresponding to the selected region; providing an archive of known geological structures; and providing an interface which permits a user to create a subsurface model of the identified region. The invention further involves related computer-implemented methods for interactive creation of geological subsurface models, for managing geological hypotheses, and for providing information for creation of geological models.

49 Claims, 10 Drawing Sheets

OTHER PUBLICATIONS

Kamps, P.T.W.J. et al., "Using GIS for hierarchical refinement of MODFLOW models" Application of Geographics Information Systems in Hydrology and Water Resources Management, Proceedings of Int'l Conf. on the Application of GIS in Hydrology and Water Resources, Vienna, Austria, Apr. 16–19, 1996, pp. 535–542, XP002098060.

Cannon, R. L. et al., "An Expect System as a Component of an Integrated system for Oil Exploration", Apr. 9, 1989, energy and Information Technologies in the Southeast, Columbia, Apr. 9–12, 1989, vol. 1, pp. 32–35, Inst. of Electrical and Electronics Engineers XP000076773.

Thiessen, R. L. et al.: "Three–Dimensional computer Analysis and Modelling of Remote Sensing–Structural Geologic Problems", Remote Sensing: Economic Tool for the Nineties, Vancouver, Jul. 10–14, 1989, vol. 1, No. SYMP. 12, Jul. 10, 1989, pp. 89–92, XP000139083.

Li–Hua Li et al.: "XPROS: A Fuzzy Expert system for Prospect appraisal", Revue de L'Institut Francais du Petrole, vol. 47, No. 3, May 1, 1992, pp. 315–323, XP000277938.

METHOD FOR CREATING, TESTING, AND MODIFYING GEOLOGICAL SUBSURFACE MODELS

CROSS-REFERENCE TO RELATED APPLICATIONS

Applicants hereby incorporate by reference simultaneously-filed U.S. patent applications Ser. Nos. 08/980,958 and 08/980,957, respectively titled APPARATUS FOR CREATING, TESTING, AND MODIFYING GEOLOGICAL SUBSURFACE MODELS and ARTICLE OF MANUFACTURE FOR CREATING, TESTING, AND MODIFYING GEOLOGICAL SUBSURFACE MODELS.

BACKGROUND OF THE INVENTION

1. Field of the Invention

Aspects of the present invention draw from the fields of geology, geography, geophysics, applied mathematics, computer science, software engineering, and ergonomics (as it relates to the design of computer interfaces). In particular, the present invention relates to computer-based methods which assist geologists (or others) in constructing, modifying, and testing geologically-consistent model(s) of the subsurface using geographic, well-bore, seismic, and geological analog data, as well as known principles of geology and geophysics.

2. Description of the Prior Art

Geologists are often required to construct models in order to facilitate the efficient extraction of hydrocarbons or minerals from the subsurface, or to control contaminants in subsurface reservoirs. A problem with constructing these models is that subsurface formations are typically either sparsely sampled or sampled at a low resolution, by measurements made in a borehole or by surface geophysical measurements. Also, the measured properties are frequently not those of direct interest to a person attempting to construct a model (e.g., seismic measurements respond to variations in acoustic impedance, whereas the geoscientist may be required to construct a model of the permeability within the subsurface). And, while there exists a large body of knowledge concerning the "interpretation" of well-log, seismic and other geophysical data (see, e.g., O. Serra, *Sedimentary Environments from Wireline Logs*, Schlumberger Technical Services Publication No. M-081030/SMP-7008 (1985)), the reality is that "interpretation" activities inevitably rely on the judgments of experienced geoscientists.

Thus, it is typically necessary to combine available measurements with geological knowledge (i.e., the knowledge typically possessed by geological "experts") in order to estimate the distribution of the parameters-of-interest in the subsurface. However, this process at least, as currently practiced is complex, cumbersome, and error-prone.

Typically, a geoscientist will attempt to interpret subsurface data on the basis of prior experience. Reasoning, based on analogies to well-characterized subsurface formations or outcrop, he/she will make assumptions about the distribution of geophysical parameters in the formation-of-interest. See, e.g., T. Dreyer, *Geometry and Facies of Large-Scale Flow Units in Fluvial-Dominated Fan-Delta-Front Sequences*, in M. Ashton (Ed.), *Advances in Reservoir Geology*, Geological Society Special Publication, 69, 135–174 (1993). When properly applied, this method of reasoning-by-analogy may allow the scientist to predict unknown properties-of-interest based upon available measurement(s) and assumptions about the nature of the formation (e.g., that it resembles the shape of a certain, known formation).

However, in addition to being a time-consuming and dependent upon the availability of appropriate geological "experts," this method of matching to analogue formations suffers from certain problems. In particular, as has been noted in the literature, e.g., I. D. Bryant and S. S. Flint, *Quantitative Elastic Reservoir Geological Modeling: Problems and Perspectives*, in S. S. Flint and I. D. Bryant (Eds.), *Geological Modeling of Hydrocarbon Reservoirs and Outcrop Analogues*, International Association of Sedimentologists Special Publication, 15, 3–20 (1993), and J. Alexander, *A Discussion on the Use of Analogues for Reservoir Geology*, in M. Ashton (Ed.), *Advances in Reservoir Geology*, Geological Society Special Publication, 69, 175–194 (1993), it is difficult to:

(i) ensure that the selected analogue is appropriate for a given subsurface formation; and (ii) scale the analogue information to best fit the formation-of-interest.

At present, systematic, rigorous, and efficient methods for scaling the spatial statistics of an "analogue formation" to best match that of a formation- or reservoir-of-interest do not exist. And, even after an initial "analogue" model is created, no systematic, rigorous, and efficient method exists for verifying or testing the model.

A number of prior-art patents address the general topic of geological modeling. U.S. Pat. No. 4,646,240, METHOD AND APPARATUS FOR DETERMINING GEOLOGICAL FACIES, incorporated herein by reference, describes a technique for automatically determining lithological facies from well-log data.

U.S. Pat. No. 5,012,675, INTEGRATING MULTIPLE MAPPING VARIABLES FOR OIL AND GAS EXPLORATION, incorporated herein by reference, describes a technique for integrating geological survey data (e.g., topographic, bathymetric, free air and Bouguer gravity, magnetic, electromagnetic, geochemical, radioactivity, temperature, biotic, geological, and other (non-seismic and non-well-logging) surveys) to locate subsurface features useful for mineral exploration.

U.S. Pat. No. 4,648,268, METHOD OF DEFINING HOMOGENEOUS ROCK FORMATION ZONES ALONG A BOREHOLE ON THE BASIS OF LOGS, incorporated herein by reference, discloses a method for processing well-log data to define formation boundaries along the borehole.

U.S. Pat. No. 4,937,747, ITERATIVE DISJOINT CLUSTER AND DISCRIMINANT FUNCTION PROCESSING OF FORMATION LOG RESPONSES AND OTHER DATA, incorporated herein by reference, details a cluster analysis-based method for computing subsurface rock classifications from well-log data.

U.S. Pat. No. 4,991,095, PROCESS FOR THREE-DIMENSIONAL MATHEMATICAL MODELING OF UNDERGROUND VOLUMES, incorporated herein by reference, describes a technique for subsurface modeling utilizing a regular grid in the longitude-latitude plane and arbitrary resolution in the depth direction.

U.S. Pat. Nos. 5,671,136, PROCESS FOR SEISMIC IMAGING MEASUREMENT AND EVALUATION OF THREE-DIMENSIONAL SUBTERRANEAN COMMON-IMPEDANCE OBJECTS, 5,475,589, SYSTEM FOR EVALUATING SEISMIC SEQUENCE LITHOLOGY AND PROPERTY, AND FOR EVALUATING RISK ASSO-

CIATED WITH PREDICTING POTENTIAL HYDROCARBON RESERVOIR, SEAL, TRAP OR SOURCE, and 4,679,174, METHOD FOR SEISMIC LITHOLOGIC MODELING, all incorporated herein by reference, describe methods for constructing subsurface images and/or models from seismic data.

U.S. Pat. No. 5,671,344, PROCESS FOR DISPLAYING N DIMENSIONAL DATA IN AN N−1 DIMENSIONAL FORMAT, describes a method for displaying 3-D seismic data on a computer display.

None of these prior-art approaches, either individually or collectively, address the need for an interactive system which enables a skilled geoscientist to effectively create and evaluate multiple, alternative models, comprised of geologically plausible, space-filling objects, while simultaneously viewing relevant portions of a massive database of geographic and geophysical data. The instant invention, as described below, addresses these, and other, needs.

SUMMARY OF THE INVENTION

Generally speaking, and without intending to be limiting, one aspect of the invention relates to computer-implemented methods of creating subsurface models, including, for example, the following: selecting a region of the world to be modeled; providing geophysical and geographical data corresponding to the selected region; providing an archive of known geological structures; providing an interface which permits a user to create a subsurface model of the identified region. The interface permits the user to, for example, perform the following: selectively view a portion of the geographical and/or geophysical data; select a structure from an archive; transform the selected structure in accordance with the geographical or geophysical data; and, repeat any or all of these steps to create the subsurface model. The method may also include checking the subsurface model for inconsistencies with the geographical and/or geophysical data and reporting inconsistencies, if any, to the user. Such checking may include both inferential and deductive checks. Also, the model may be checked for internal inconsistencies.

Again, generally speaking, and without intending to be limiting, another aspect of the invention relates to computer-implemented methods for interactive creation of geological subsurface models, including, for example, the following: identifying a region of the world whose subsurface is to be modeled; creating a number of hypotheses regarding the geology of the identified region; testing one or more of the hypotheses; and, modifying one or more of the hypotheses. Any hypothesis may have one or more sub-hypotheses, thereby creating a tree-like hierarchy. Hypotheses (and sub-hypotheses) within the same tree are preferably checked for internal consistency. Hypotheses may be tested, both inferentially and deductively. Each hypothesis preferably includes: information identifying a portion of the subsurface; and information concerning at least one property associated with the identified portion. A hypothesis may be validated by inference and comparison with seismic data, well-log data, and/or flow data, or by performing a geophysical simulation. A hypothesis may also be deductively checked against other related hypotheses.

Again, generally speaking, and without intending to be limiting, another aspect of the invention relates to a computer-implemented method for managing geological hypotheses, including, for example, the following: providing a user-interface for creating hypotheses; hierarchically organizing hypotheses into a collection of tree-like structures; reorganizing the tree-like structures in accordance with user directions; and, maintaining hierarchical, internal consistency among the hypotheses. Each hypothesis is either a root hypothesis (in which case, it has no parent) or a sub-hypothesis of another hypothesis (the parent hypothesis). A sub-hypothesis preferably contains of the information of its parent, plus additional information. A hypothesis may identify or characterize the depositional system or stratigraphic sequence for a given interval. Hypotheses may be deleted or rearranged in the hierarchy. Hierarchical, internal consistency can be maintained by ensuring that, for every parent hypothesis/sub-hypothesis pair, information contained in the sub-hypothesis is not logically inconsistent with information contained in the parent hypothesis.

Again, generally speaking, and without intending to be limiting, another aspect of the invention relates to computer-implemented methods of providing information for creation of geological models, including, for example, the following. For a selected region of the world, selectively displaying, under user control, selected portions of: geographical data from the selected region; geophysical data from the selected region; and, archive data from other regions. Geographical data may include, for example, aerial photographs, 2-D outcrop photographs, 3-D outcrop textures, core photos, political boundaries, and thin sections. Geophysical data may include, for example, seismic data, textural logs, well logs, vertical seismic profiles, and ground-penetrating radar data. Archive data may include, for example, any of the foregoing, plus surfaces, geometries, closed-form bodies, facies descriptions, bio stratigraphy, and paleo geography.

The advantages of the instant invention include improved productivity in creating geological models and improved precision of the models themselves. As a result of superior modeling precision, well placement and production forecasting also improve.

BRIEF DESCRIPTION OF THE FIGURES

One embodiment of the invention is depicted in the attached set of figures, which set is intended to be exemplary (and not exhaustive or limiting), and in which.

DETAILED DESCRIPTION OF THE PREFERRED EMBODIMENT

The invention is described with reference to a presently-preferred embodiment, CyberGeologist. CyberGeologist is a computer-implemented system. It includes a plurality of instructions, embodied in a computer-readable medium (including, without limitation, RAM, ROM, or other solid-state media, and/or magnetic, magneto-optical, or optical devices), which cause a computer (of any sort, including, without limitation, palm-top devices, so-called PDA's, PC's, engineering workstations, mini-computers, mainframe computers, and super-computers) to process data representative of geological and/or geophysical phenomena in accordance with the invention.

Figures 1, 1A:
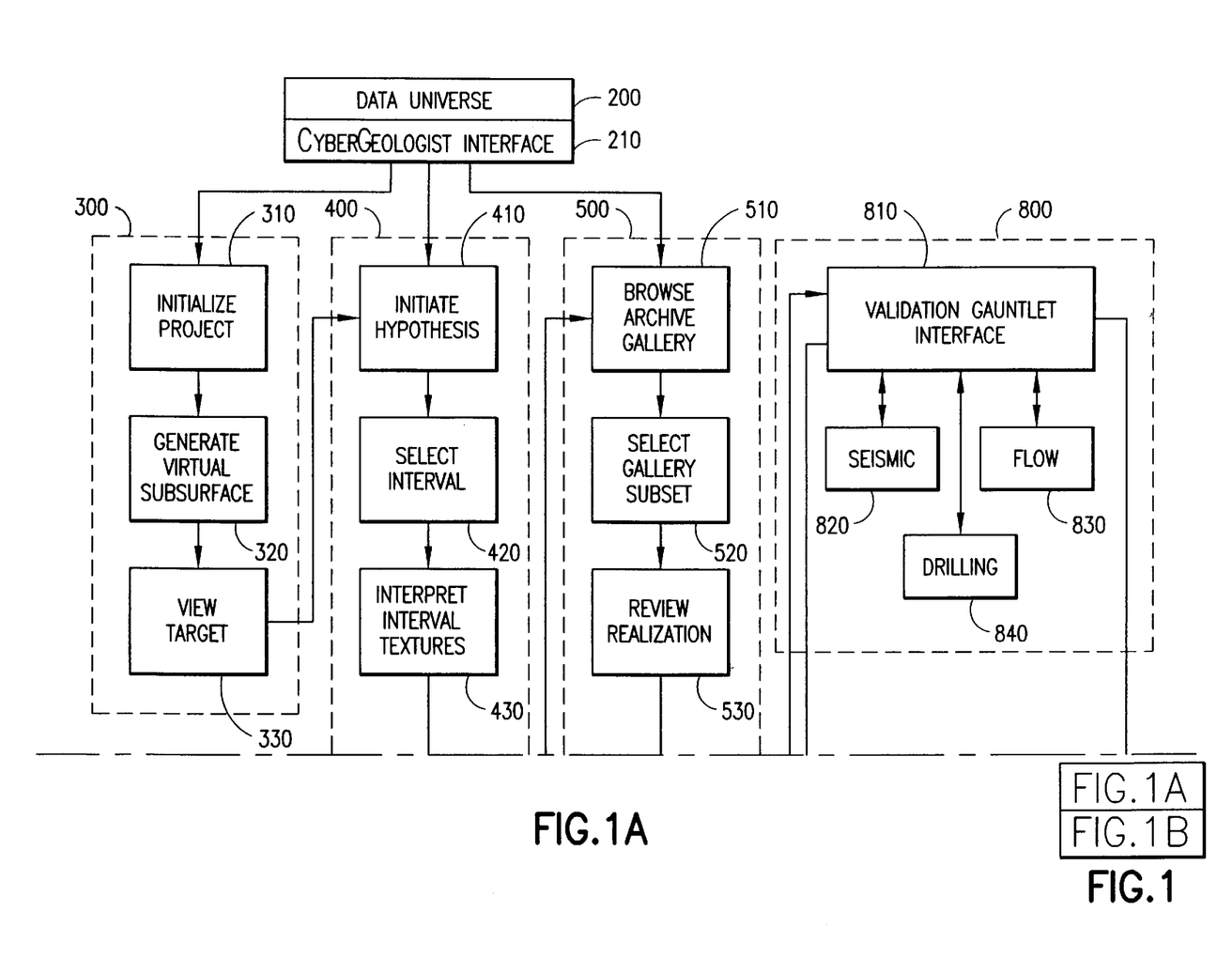
FIG. 1 depicts the overall operation of the CyberGeologist system.
Figure 1B:
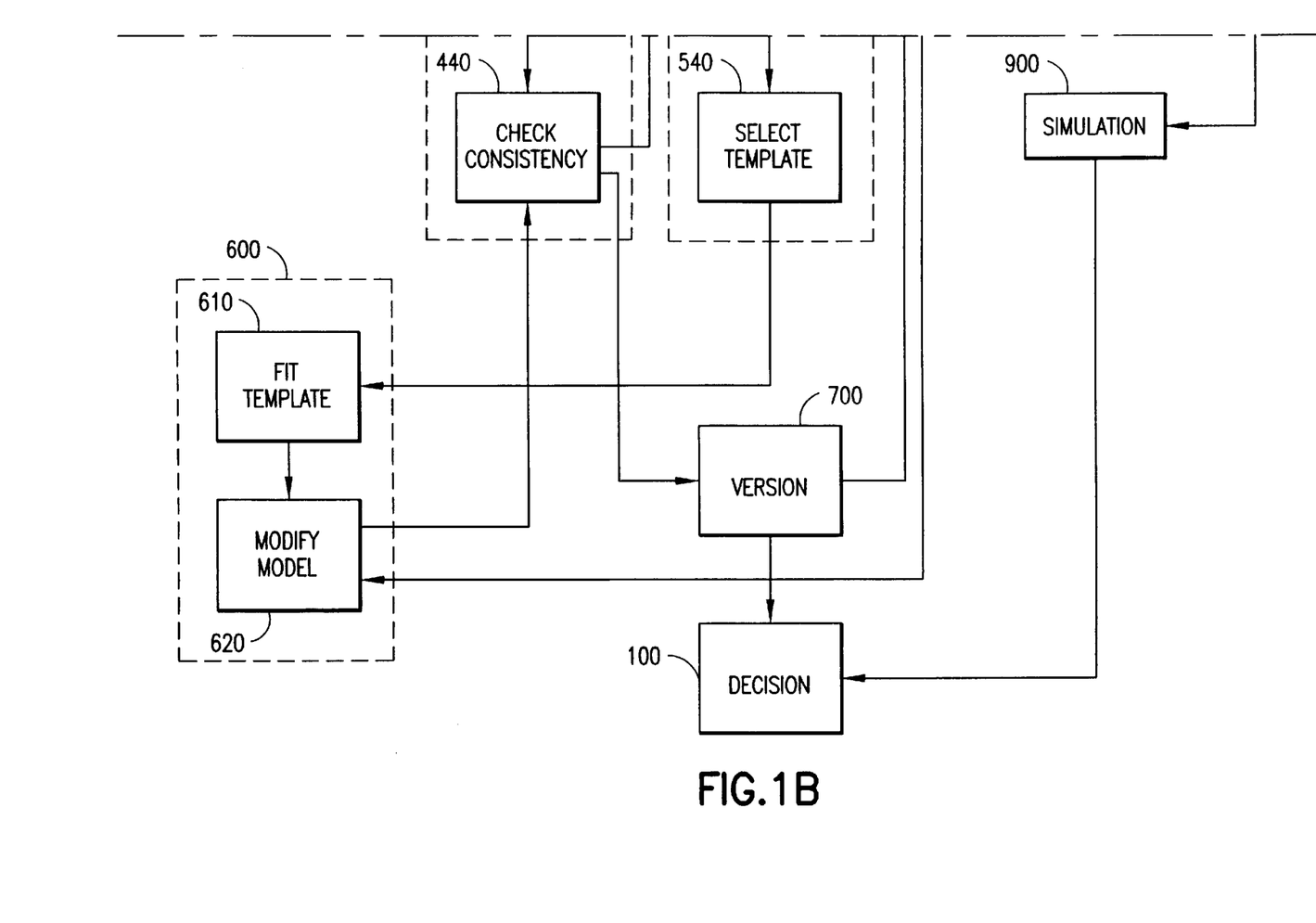

CyberGeologist is an interactive system, designed to assist the geoscientist in interpreting geophysical (and other) data, and to facilitate the construction of 3-D geological models therefrom. Consequently, as shown in FIG. 1, CyberGeologist includes a user interface 210. User interface 210 includes graphical display device (of any sort, including, without limitation, a CRT display, flat-panel display, projection device, of virtual-reality goggle device), a user input device (of any sort, including, without limitation, a keyboard, mouse, other pointer device, voice-recognition system, or other biometric device), and instructions which cause the CyberGeologist system to compose appropriate displays (as exemplified in FIGS. 4–9) and react in accordance with user instructions.

CyberGeologist embodies a fundamentally new approach to geology. In essence, CyberGeologist is a toolkit for use by geologists in making decisions about oil and gas recovery. The user of CyberGeologist is able to predict, away from the borehole. These predictions are accomplished primarily by geology, and secondarily by tools for geologists to synergize their expertise with other data.

In nature, hydrocarbons are pooled in sediments that are heterogeneous and have compartments. This is why geology is important. If sediments appeared in simple, uniform layers, then geology would be unnecessary for recovery. But the compartments (in which hydrocarbons lie) are formed by the deposits of ancient rivers and beaches, for example, that have been buried by millions of years of sedimentation and deformed by mountain-building, and are more or less isolated. Faults may produce compartments. Seismic measurements often do not have the resolution to delineate the compartments; wellbores frequently are very few and very far between. The boundaries of these compartments control the flow paths for fluids (and gases) during recovery. The geologist, who has worked a lifetime on rivers and beaches, and is best trained to determine the compartment boundaries (for decision-making purposes), currently has no tool to do so.

CyberGeologist is a tool which assists the geologist in determining boundaries and flow paths, thus facilitating the efficient placement of wells in complex reservoirs.

Reference is now made to FIG. 1, which depicts the overall operation of the CyberGeologist system. (Note: While FIGS. 1–3 have certain arrows depicting an exemplary order of flow through the CyberGeologist system, there is, in reality, no requirement that the various modules or functions be invoked in any particular order; rather, user interface 210 is flexible, and permits a user to navigate through the modules in any order.) Using interface 210, a user selects his/her project, with the assistance of project manager 300. Basically, a project comprises a defined region of the earth's surface (and/or subsurface), along with a set of interpretations (or hypotheses) regarding the geological features in the defined region. In the case of a pre-existing project, the project may include a variety of previously-created hypotheses. By contrast, in the case of new project, there is empty space, along with geographical (e.g., aerial surface photographs and topological maps) and geophysical (e.g., seismic 820, flow 830, and drilling 840) data.

Figure 2:
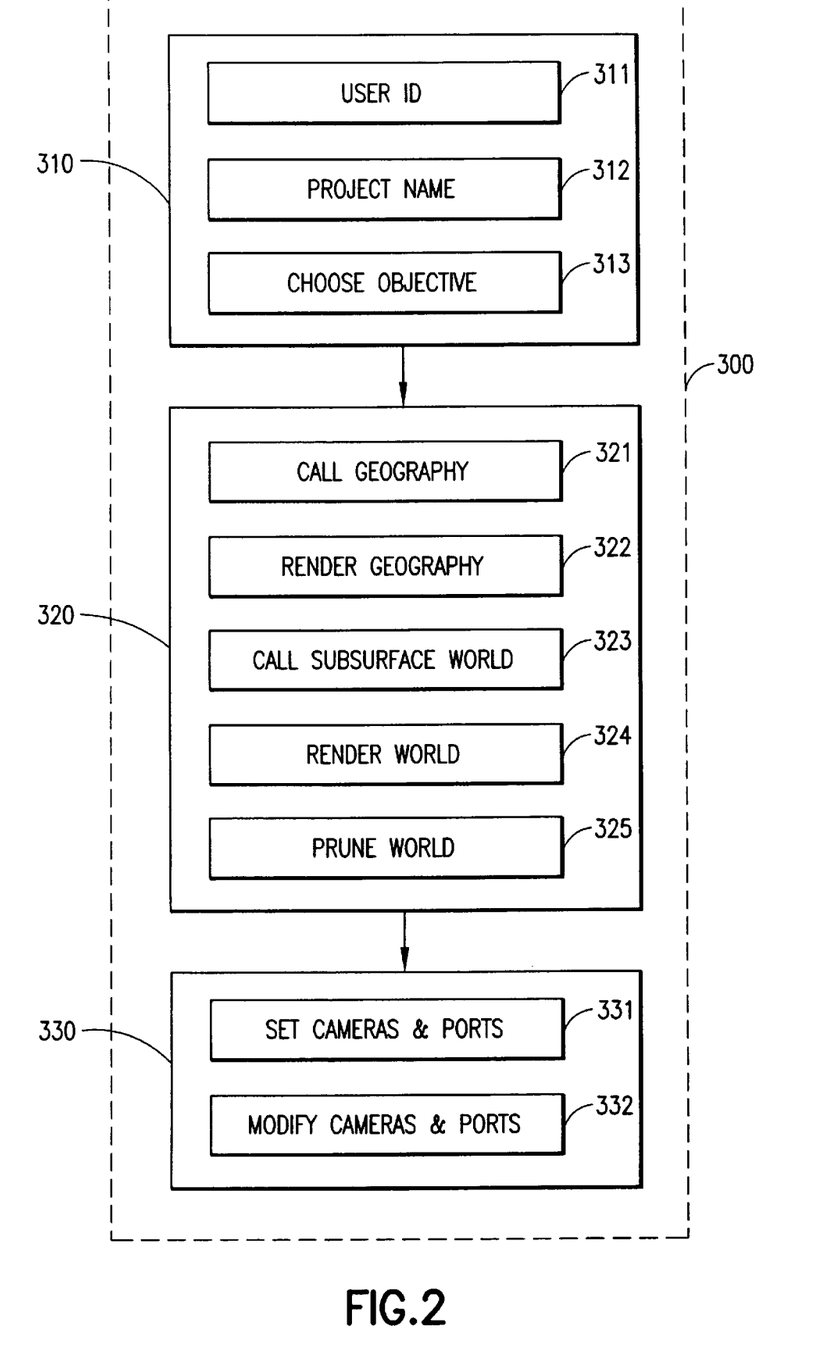
FIGS. 2–3 further detail selected elements of FIG. 1.

As illustrated in FIG. 2, project initiation 310 illustratively comprises identifying the user 311, assigning a project name 312, and defining an objective 313. The system then generates a virtual-reality model of subsurface, from which the user directs his/her interpretation activities.

Generating a virtual subsurface 320 illustratively comprises obtaining geographical data from a database 321, rendering the geographical data 322 into a form appropriate for display and manipulation through the user interface, obtaining subsurface geophysical data 323, rendering the subsurface data 324 for use by the interface, and pruning the data 325 to include only that which the user wishes to include. Typically, the next step involves the user's defining various targets for viewing in the interface 330, which step illustratively comprises setting cameras and viewports 331 (and/or modify cameras and viewports 332).

Figure 3:
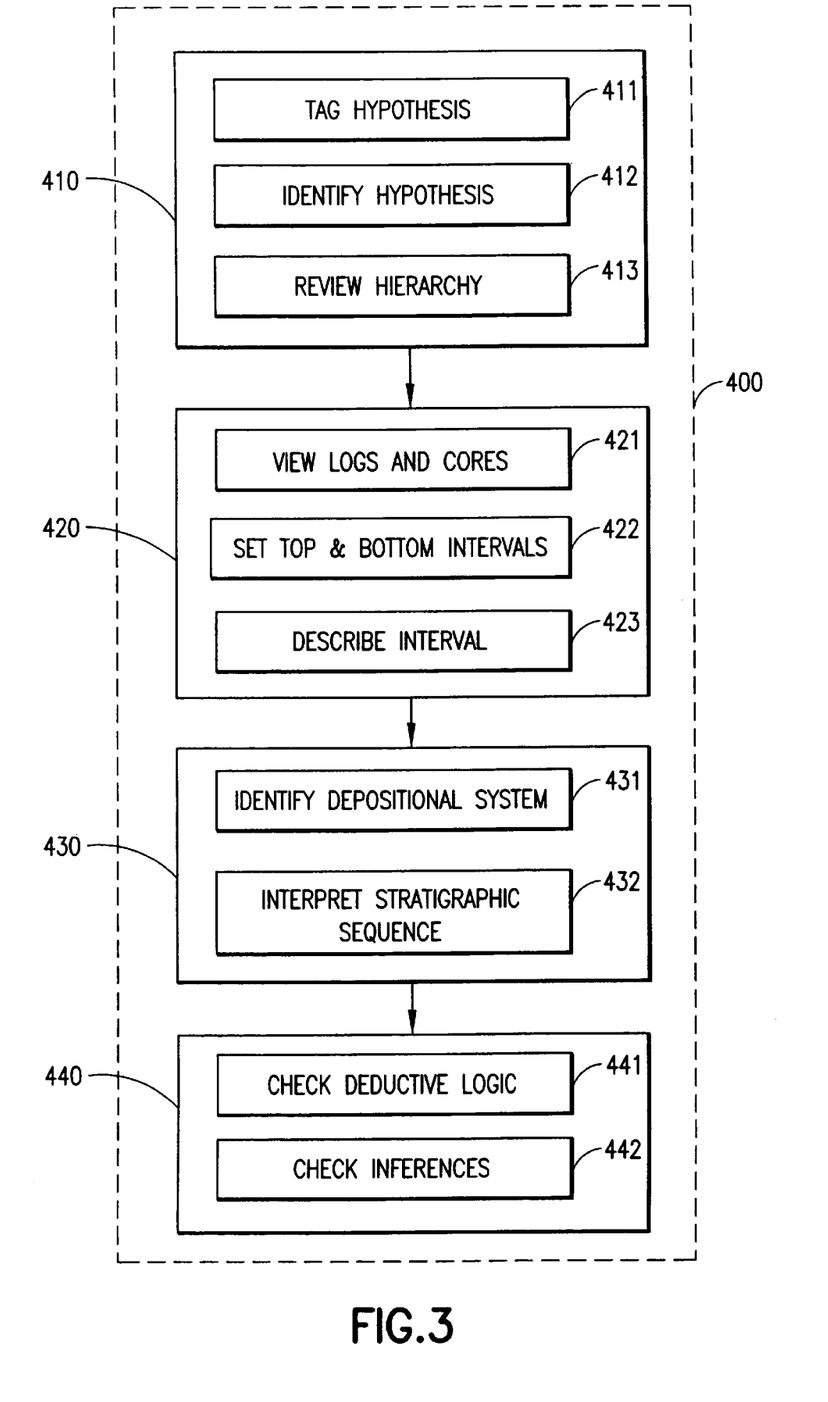

As depicted in FIG. 3, hypothesis manager 400 provides a framework for interpreting (and hence modeling) the subsurface world. With the various targets in view, the user creates (or augments) a hypothesis. In CyberGeologist, hypotheses are created and managed in tree-like structures. Thus, hypotheses are naturally organized into subsets. Any hypothesis may have one or more sub-hypotheses, each of which may also have one or more sub-hypotheses, etc.

A hypothesis assigns an interpretation (i.e., one or more properties) to a region of space (an "interval") in the virtual subsurface. Hypothesis generation begins by initiating a hypothesis 410. As shown in FIG. 3, hypothesis initiation illustratively comprises creating a record (or tag) for the hypothesis 411, identifying (or describing) the hypothesis 412, and reviewing the hierarchy 413 to place the hypothesis in its proper position in the hierarchy.

Next, the user will typically set the interval to which the hypothesis will pertain. In this step 420, geophysical data is viewed 421, and the user selects an interval-of-interest 422 for interpretation.

Interpreting the selected interval 430 illustratively comprises identifying the depositional system 431 and/or interpreting the stratigraphic sequence 432 in the selected interval. Interpretation 430 is performed interactively, by the user; he/she works with the interface to display geographical and geophysical data in a manner to reveal the property or feature upon which an interpretation is made.

Once a hypothesis is formulated, it preferably undergoes an immediate consistency check 440, the results of which are reported to the user. In CyberGeologist, consistency checking 440 illustratively comprises checking deductive logic 441 (e.g., to ensure self-consistency among parent and child hypotheses) and/or checking inferences 442 (e.g., against geophysical data).

Generally speaking, deduction operates from the general to the specific. A number of well-known geological rules lend themselves to deductive application, for example, Walther's Law: "The various deposits of the same facies area, and similarly, the sum of the rock of different facies area, were formed beside each other in space, but in crustal profile, we see them lying on top of each other. It is a basic statement of far-reaching significance that only those facies and facies area can be superimposed, primarily, that can be observed beside each other at the present time." (See O. Serra, 1985, at 49). Also, in regard to electro-facies, the Rule of Non-Crossing Correlations—"layers are deposited one over another, so that they can wedge out but they cannot cross" (O. Serra, 1985, at 187–88)—provides a basis for deductively checking the plausibility of an electro-facies sequence.

Inference, on the other hand, generally operates from the specific to the general. For example, a user may "infer," from well-log responses, that a given interval is a sandstone, thus relating the specific instance (i.e., the particular well-log response) to the more general (i.e., sandstones). Other inferential examples appear in the previously-incorporated '240 patent. See U.S. Pat. No. 4,646,240, col. 29, ln. 34—col. 31, ln. 61.

Deductive rules can be used to check inferences. For example, assume that a user has inferred the clay content for a given region. Assume also that, independent of the data considered by the user, the database contains gamma-ray data, and that the gamma-ray data shows a low-level plateau in the region of interest. At this point, deductive application of known rules of gamma-ray interpretation (see, e.g., '240 patent, "Rule 008") can be used to determine the plausibility of the clay-content hypothesis.

Once a hypothesis passes these internal consistency checks, a user typically proceeds to the gallery 500. Gallery 500 provides an interface to a database of geological and geographical archive data, including, but not limited to, geographical data (such as aerial photographs, geological data (such as 2-D outcrop photographs, 3-D outcrop textures, core photos, and thin sections), geophysical data (such as seismic data, textural logs, well logs, vertical seismic profiles, and ground-penetrating radar data), and archive data, such geometrical objects or models (such as surfaces, geometries, and closed-form bodies) or other geological data (such as facies descriptions, biostratigraphy, and paleogeography).

Two basic tasks occur in the gallery. The first is model selection, and the second is selection of objects for placement into the subsurface 3-D world. The user typically will enter gallery 500 with some piece of data and browse the archive gallery 510 looking for examples of bodies fitted to data which, when properly fitted, most closely match the incoming data; or, the user may enter with no data and wish to view all objects, generic or fitted, and pick one. Gallery 500 is preferably organized into subsets of related objects; thus, browsing through the gallery may involve selecting a subset 520, and reviewing the contents therein. He/she may then review a realization 530 of the selected object in a 3-D viewer. Once a template is selected 540, the user may proceed to the workshop 600.

Workshop 600 allows the user to interact with varying data types in 3-D, and at the correct scale. This allows the user to value the data, instead of a generalization. There are two objectives: the first is three dimensional interpretation, and the second is model building.

The purpose of the workshop is to allow the user to interact with the scales, and manipulate models in a uniform three dimensional context. Data from the project can be displayed in concert with the 3-D image of the template. The user selectively views the data at scales ranging from centimeters to kilometers. The workshop viewer allows the user to interact with the project data using a set of tools. These tools provide the following functions: image processing of the seismic volume, selection of data types and representation on a per well or per project basis, camera control, one-dimensional exaggeration, etc. Another set of tools allows the user to make interpretive changes and deformations.

Using these tools, the user can attempt to fit an archive template 610 to the project data. Typically, this process will involve several modifications or transformations of the template 620 to achieve an acceptable fit.

Figure 4:
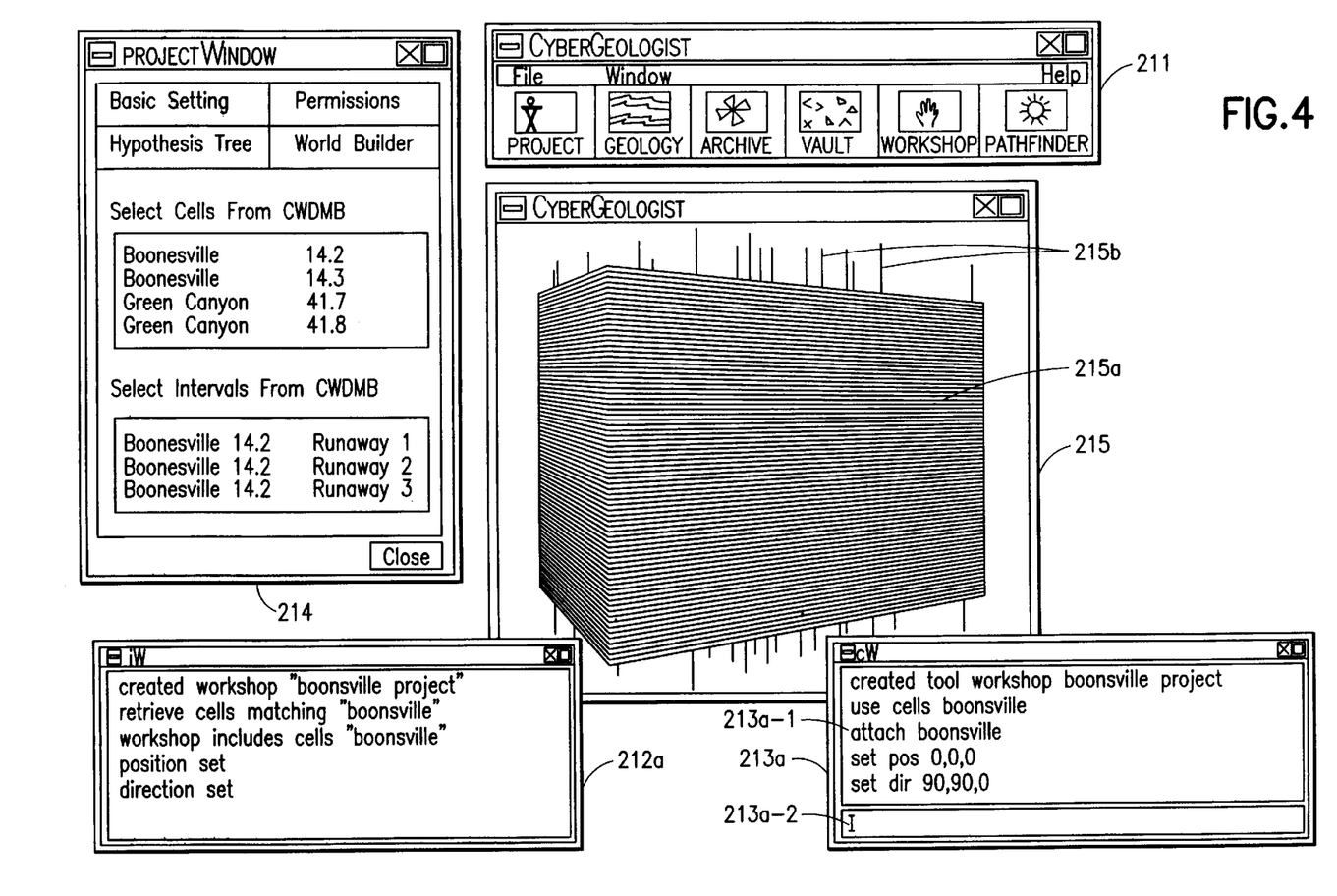
FIGS. 4–9 exemplify various states of the CyberGeologist user interface.

Reference is now made to FIG. 4, which depicts user interface 210, as it would appear shortly after project initialization. Navigation window 211 permits the user to invoke project, geology, archive, vault, workshop, and pathfinder functions. Command window 213*a* shows a history 213*a*-1 of the commands issued to CyberGeologist, and provides an input field 213*a*-2 through which an advanced user can operate the system in command-line mode. Information window 212*a* displays a history of diagnostic and/or status-indicating response messages from CyberGeologist. Project window 214 provides a plurality of menus/forms for project selection, initialization, or management. And window 215 displays a selected rendering of the virtual subsurface.

Depicted in window 215 is an illustrative 3-D seismic volume 215*a* and a plurality of wellbores 215*b*. Command window history list 213*a*-1 shows that the user has selected a cells from the "boonsville" project, loaded this data, and established a camera position/direction for window 215's view. Status information displayed in information window 212*a* verifies CyberGeologist's successful completion of this select/load/position command sequence.

Figure 5:
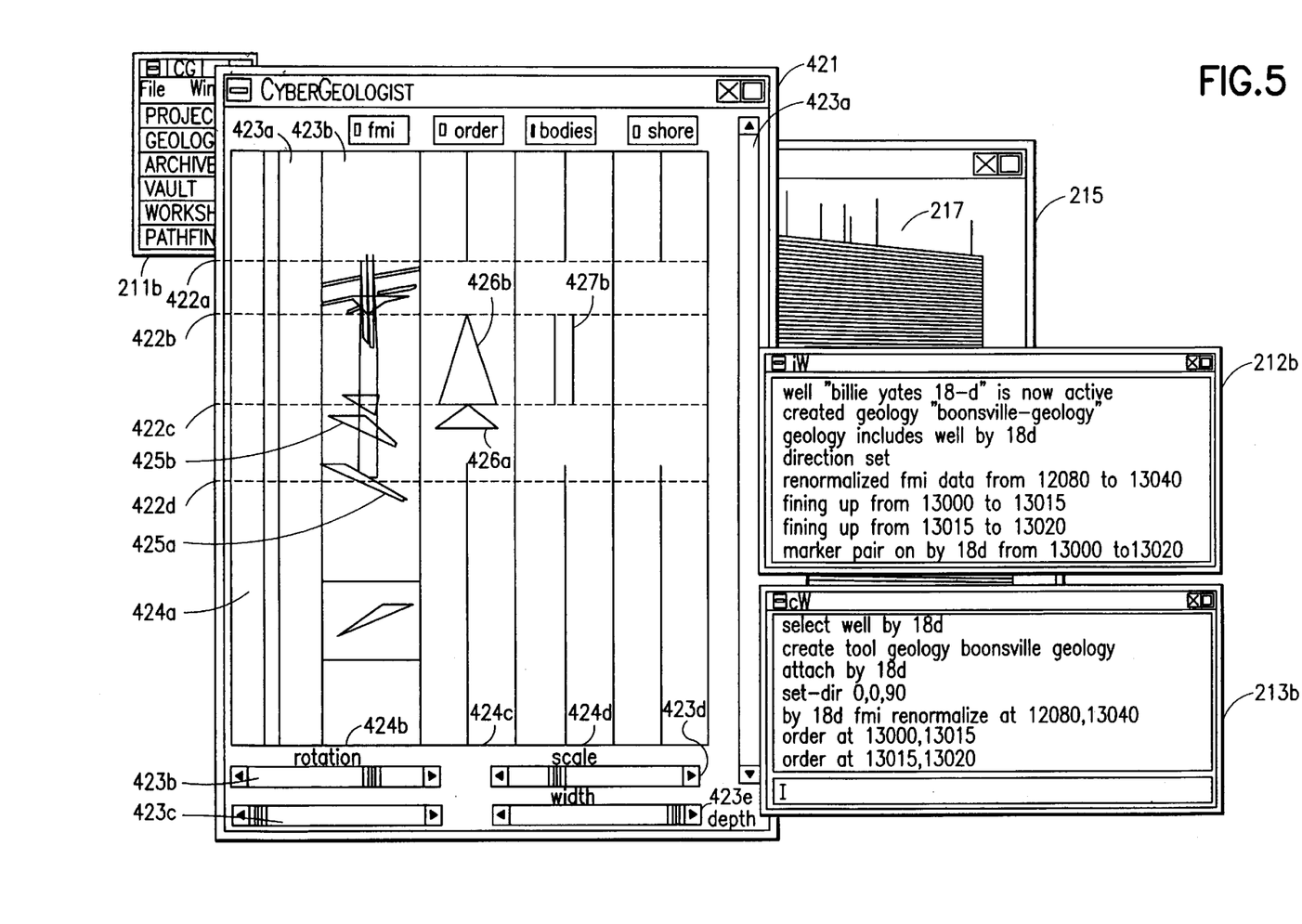

Reference is now made to FIG. 5, which depicts a further illustrative view of the CyberGeologist interface 210. Here, navigation window 211*b* appears in a compacted form, but still provides the same functionality as window 211. Window 215's view of the virtual subsurface is now partially obscured behind other windows. (Note: The user has complete control to position these, as well as other, windows in whatever configuration is desired, so as, for example, to simultaneously display geographical, geophysical, wellbore, archive, and/or project status data in whatever combination is desired.)

Command window 213*b* indicates that the user has selected a well 217 (i.e., well "by18d") from virtual subsurface 215, and information window 212*b* confirms the selection. Command window 213*b* further reveals that the user has invoked the workshop's "geology" tool, and, once again, information window 212*b* confirms invocation of the geology tool and the parameters of its invocation.

Window 421 illustrates one aspect of the geology tool interface. Depth is represented along the vertical dimension, and a depth slider 423*a* permits the user to select a depth for display. A plurality of further sliders 423*b–e* provide control of other display parameters.

Geology window 421 includes a number of side-by-side illustrative tracks 424*a–d*. (Once again, these tracks can vary in number and type, all under user control. Those shown are merely exemplary.)

Figure 6:
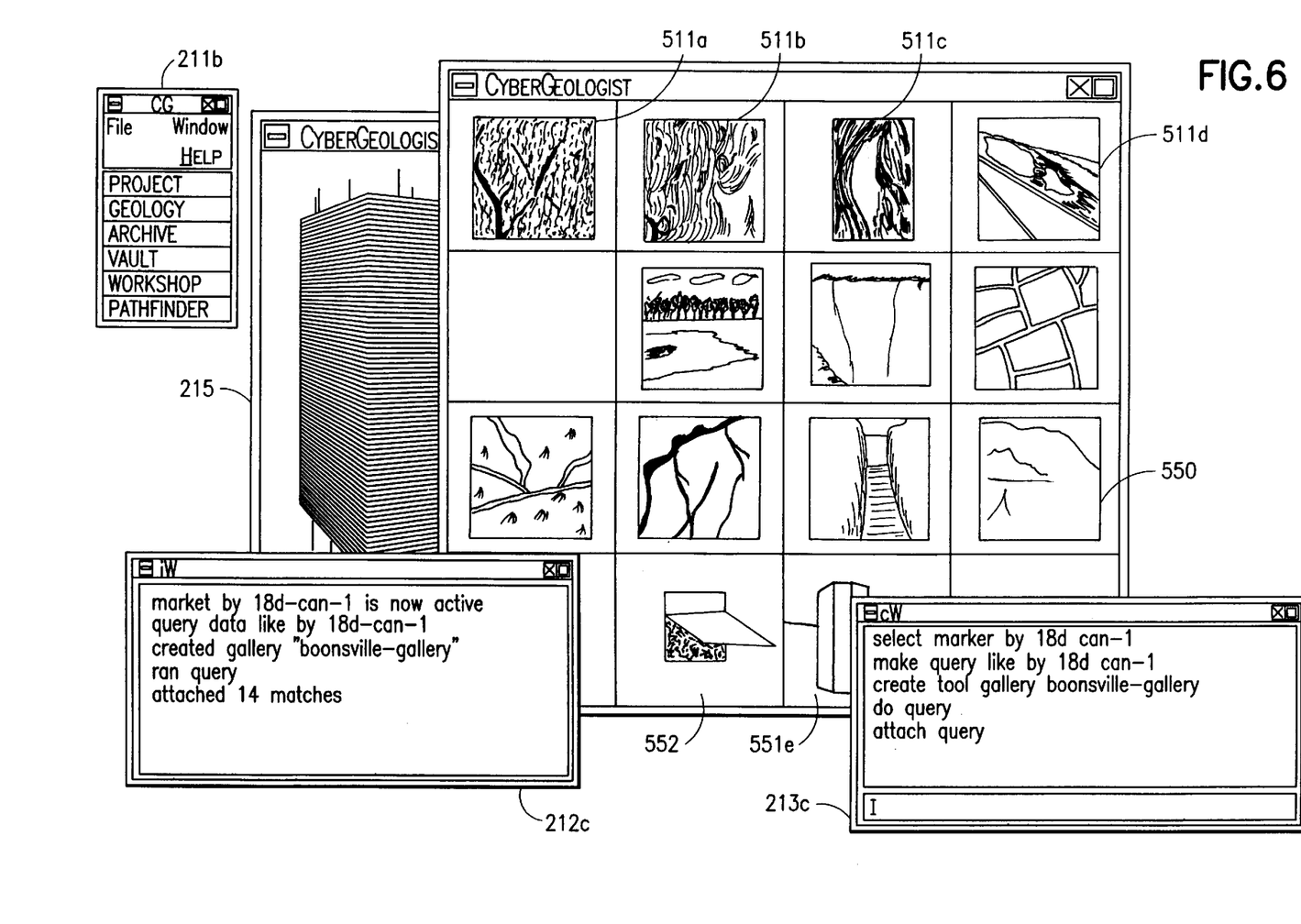

Track 424*a* displays an exemplary section of an FMI image. (Formation Micro Imager ("FMI"), a trademark of Schlumberger, is a resistivity-based wellbore imaging tool. The depiction of an FMI image in FIG. 6 is merely exemplary. Track 424*a* could alternatively contain any known type of wellbore data. The object is to enable the user to effectively segment the wells to focus attention on a small sub-portion of the formation volume) Since FMI images have azimuthal resolution, slider 423*b* provides a means for selecting the orientation of the track 424*a* image.

A common characteristic of wellbore data is that, over substantial depths, it often varies too much for meaningful, contrast-based visual display. This phenomenon is evident in track 424*a* where, between depths 422*a* and 422*d*, the image is essentially white. CyberGeologist provides a renormalization tool, whereby sections of the data can be renormalized and displayed at maximum contrast, to support the interpretation task. Track 424*b* displays a renormalized portion (i.e., between depths 422*a* and 422*d*) of track 424*a*'s FM image. (Renormalization is just one of a variety of image enhancement and processing tools in the CyberGeologist toolkit. Other operations, such as internal segmentation, grainsize characterization, and sequence stratigraphy, are provided as well.)

As is apparent in FIG. 5, the renormalized image 424*b* reveals a number of interpretive possibilities. Using the images, as well as any other data that the user may wish to consult, the geoscientist can begin the process of hypothesizing the dips and other features of the subsurface. FIG. 5 illustrates several hypotheses (e.g., 425*a–b*) concerning dips in the formation facies.

Tracks 424c–d provide an illustration of further hypotheses concerning the depicted well section. As can be seen in track 424c, the user has hypothetically identified two sections 426a–b as point bars in a meandering river, and has identified the lithology of point bar 426b as a sandstone. The user can continue this process of creating hypotheses, changing the data windows (e.g., renormalizing, selecting and viewing other types of log data if available, looking at core data, etc.), creating alternative hypotheses, deleting implausible hypotheses, etc., as long as need. Then, after the user has arrived at a satisfactory, self-consistent set of hypotheses, he/she will then proceed to the next step—identifying appropriate analogue(s) for the region(s)-of-interest.

Reference is now made to FIG. 6, which depicts a further illustrative view of the CyberGeologist interface 210. As shown in command window 213c, and confirmed by information window 212c, the user has queried the archive 500 and invoked a gallery window 550 to display the retrieved analogue data.

Gallery window 550 provides a pictorial means for navigating the archive of geological analogue data. Visible in window 550 are a plurality of selectable thumbnail images (e., 551a–d), each preferably corresponding to a 3-D archive object. These archive objects can include both examples from nature (e., 551a–d) as well as geometrical models (e.g., 551e).

Gallery window 550 also provides a visual interface for searching the archive to find structures of interest. In its browse/search mode, each of the thumbnails (e., 551a–e) of gallery window 550 permits the user to retrieve related (e.g., graphically or geologically similar) structures from the archive, which then are displayed in thumbnail form, permitting further selection and search. Alternatively, the user can search or browse the archive by entering search queries in command window 213c, with the results again being displayed gallery window 550.

Figure 7:
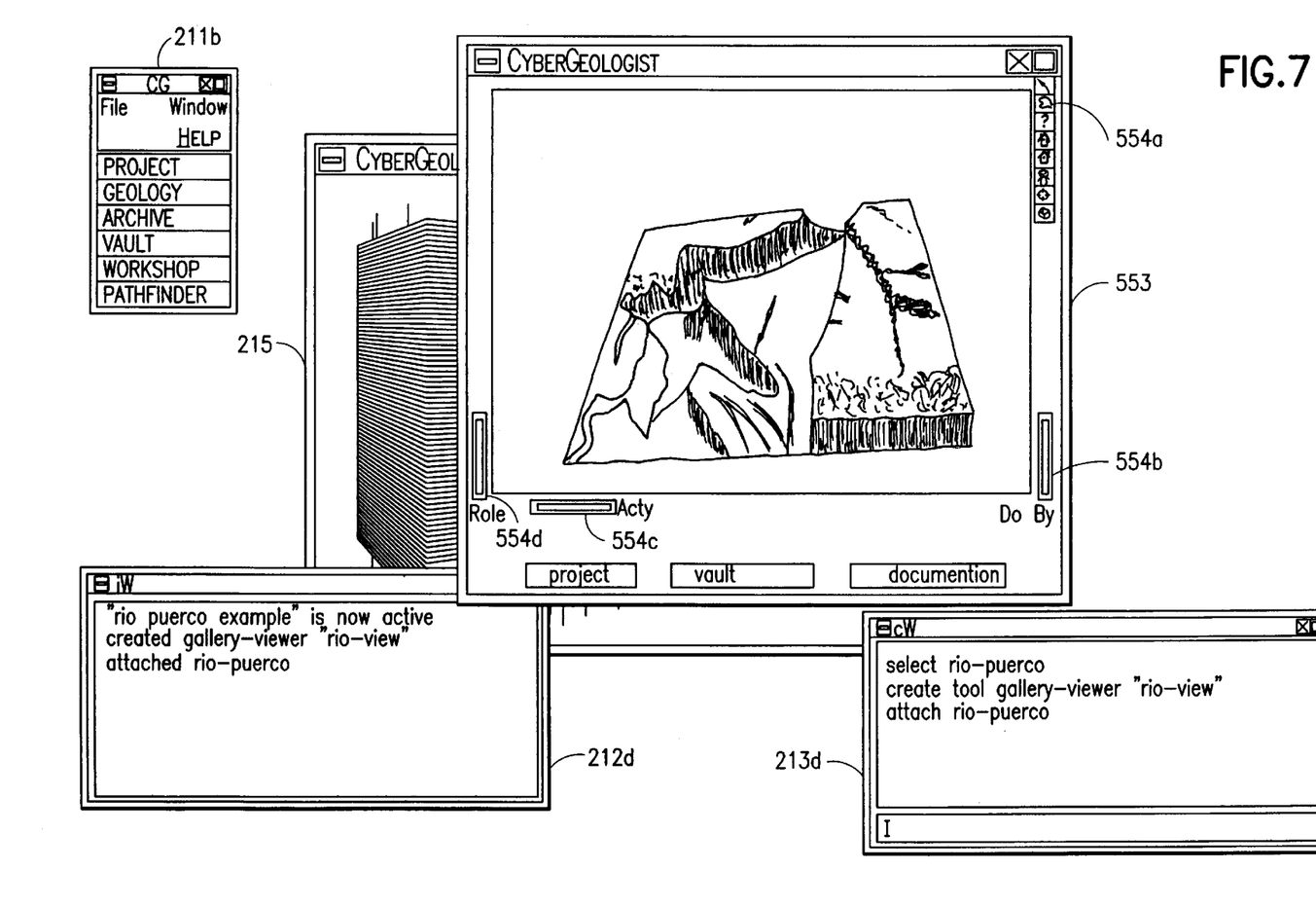

After searching/browsing the archive through gallery window 550, the user may select a particular structure (e.g., thumbnail 552) for more detailed examination. Reference is now made to FIG. 7, which depicts a further illustrative view of the CyberGeologist interface 210, in which the user has selected thumbnail 552 (see FIG. 6) for further examination. As shown in command window 213c (and confirmed in information window 212d), the user has selected an archive object (designated "rio puerco") for detailed examination in window 553.

Window 553 provides a complete set of visual controls, thus permitting the user to view any aspect of the available 3-D geometrical detail. Among the illustrated controls are a set of graphical editor controls 554a (which control positioning, scaling, etc.) and a set of 3-D rotational controls 554b–d. Using window 553, the geoscientist can explore the selected object to identify particular features it might contain (e.g., rivers, beaches) which can be analogized to the observed subsurface data (such as that shown in FIG. 5, window 421).

Figure 8:
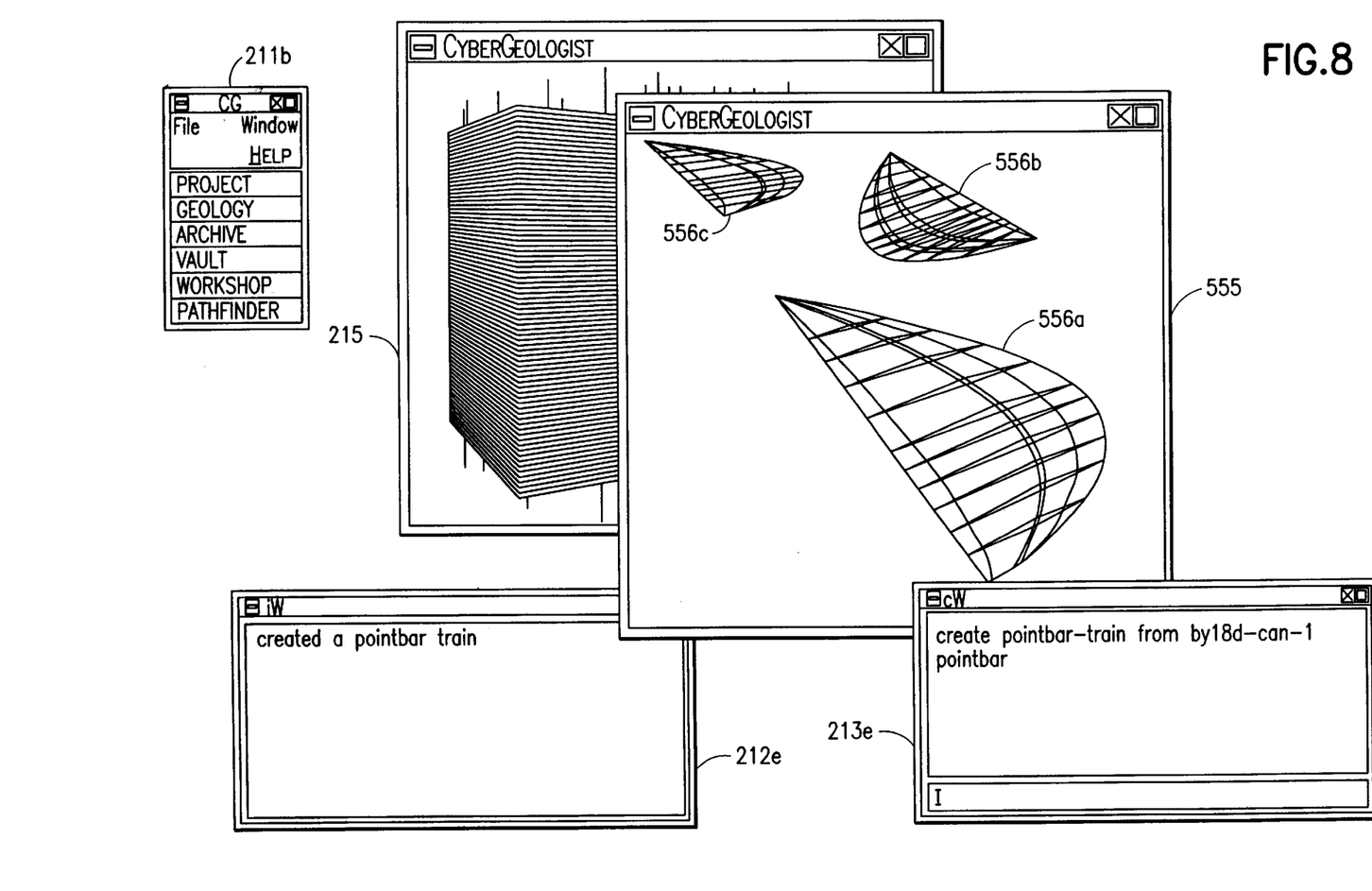

Reference is now made to FIG. 8, which depicts a further illustrative view of the CyberGeologist interface 210, in which a geometrical vault object 556a (along with several transformations 556b–c of it) is displayed in a workshop window 555. As shown in command window 213e and information window 212e, the user has selected a "pointbar" object 556a for display and manipulation in the workshop.

The workshop provides a variety of tools for selecting manipulating, and deforming (e.g., stretching, cropping, conforming to lines/surfaces, etc.) 3-D geometrical objects. Using the workshop, the geologist creates and reshapes a geometrical object to fit observed features of the subsurface formations. FIG. 8 shows two exemplary transformations 556b–c of the pointbar object 556a.

Figure 9:
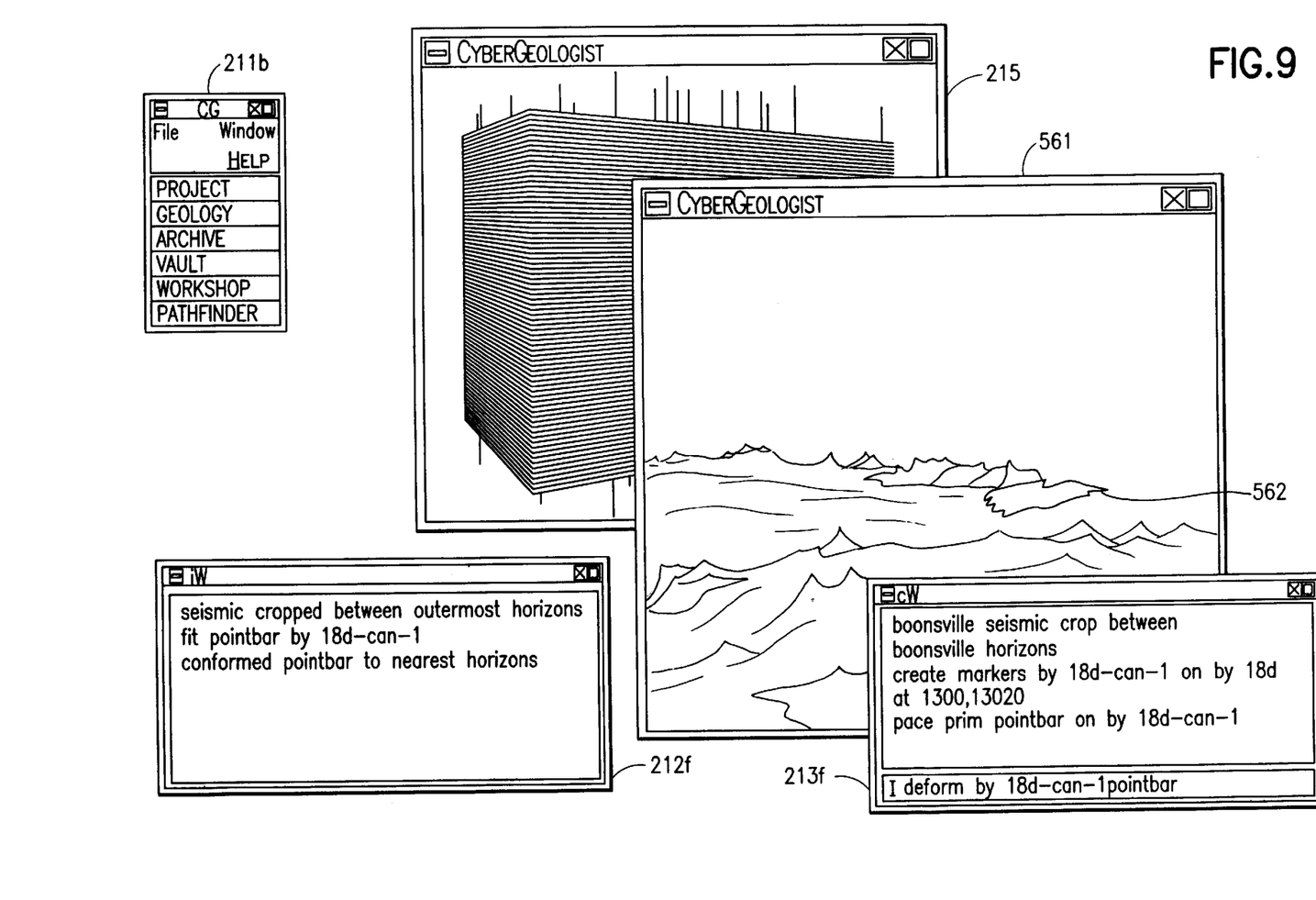

Reference is now made to FIG. 9, which depicts a further illustrative view of the CyberGeologist interface 210. Here, an additional workshop window 561 has been created (se command window 213f and information window 212f) to display a selected seismic horizon from subsurface 215. The user then applies CyberGeologist's "pathfinder" tool to "place" the pointbar 562 object, and deform it to fit the observed seismic contours.

Having now "placed" the pointbar object in the subsurface, one exemplary pass through the CyberGeologist workflow is now complete. To briefly recap, the process began with selection of a subsurface region of interest, continued with detailed observation, renormalization, and interpretation of available subsurface data, then proceeded to review and search of archive data for possible sources of analogue data, continued by selection of a geometrical object from the vault and deformation of the selected object to align with the formation contours, and finished by fitting the selected/deformed object to match the seismic contours of the formation. Through repetition of this process, the geologist can create highly accurate, geologically meaningful models of subsurface formations.

Finally, CyberGeologist preferably interfaces with a Validation Gauntlet 810 (see FIG. 1) to assist the geoscientist in validating the created model(s). Validation may involve one or more of the following: (i) comparison with seismic reflector data 820 (techniques for performing such comparisons are well known in the art); (ii) comparison with well-log data 840 (which can be accomplished either with mathematical or artificial intelligence (i.e., deduction and inference) techniques); and/or (iii) comparison with flow data 840 (see, e.g., U.S. Pat. No. 5,548,563, WELL TEST IMAGING, incorporated herein by reference). Alternatively, or as an additional, final step, a user can request a detailed geological simulation 900 to assist in deciding 100 whether to accept, reject, or modify the prospective subsurface model.

While the foregoing has described and exemplified aspects of various embodiments of the present invention, those skilled in the art will recognize that alternative elements and techniques, and/or combinations and permutations of the described elements and techniques, can be substituted for, or added to, the embodiments and methods described herein.

What is claimed is:

1. A computer-implemented method of creating subsurface models, comprising:
   (i) selecting a region of the world to be modeled;
   (ii) providing geophysical and geographical data corresponding to said selected region of the world;
   (iii) providing an archive of known geological structures;
   (iv) providing an interface which permits a user to create a subsurface model of the identified region by:
      (a) selectively viewing a portion of the geographical and/or geophysical data;
      (b) selecting a structure from the archive;
      (c) transforming the selected structure in accordance with the geographical or geophysical data; and,
      (d) repeating steps (a), (b), and/or (c) to create the subsurface model.

2. A method according to claim 1, wherein step (iv) further comprises the sub-step of:

(e) checking the subsurface model for inconsistencies with the geographical and/or geophysical data.

3. A method according to claim 2, wherein step (iv) further comprises the sub-step of:

(f) reporting inconsistencies, if any, to the user.

4. A method according to claim 2, wherein sub-step (e) includes deductive logic checking.

5. A method according to claim 2, wherein sub-step (e) includes inferential logic checking.

6. A method according to claim 1, wherein step (iv) further comprises the sub-step of:

(e) checking the subsurface model for internal inconsistencies.

7. A method according to claim 6, wherein step (iv) further comprises the sub-step of:

(f) reporting the internal inconsistencies, if any, to the user.

8. A computer-implemented method for interactive creation of a geological subsurface model using a graphical display device and a user input device, comprising:

identifying a region of the world whose subsurface is to be modeled;

displaying geophysical and geographical data corresponding to said identified region of the world using said graphical display device;

creating a plurality of hypotheses regarding the geology of the identified region using said user input device;

testing one or more of said hypotheses; and modifying one or more of said hypotheses.

9. A method according to claim 8, further comprising:

organizing said hypotheses into one or more trees, such that any hypothesis may have one or more sub-hypotheses.

10. A method according to claim 9, further comprising:

checking for internal inconsistencies, if any, between hypotheses and sub-hypotheses in the same tree.

11. A method according to claim 10, further comprising:

reporting said internal inconsistencies to the user.

12. A method according to claim 8, wherein testing comprises deductive logic checking.

13. A method according to claim 8, wherein testing comprises inferential logic checking.

14. A method according to claim 8, wherein each hypothesis includes:

information identifying a portion of the subsurface; and information concerning at least one property associated with said identified portion.

15. A method according to claim 8, further comprising:

validating at least one of said hypotheses.

16. A method according to claim 15, wherein validating comprises:

comparing with seismic data.

17. A method according to claim 15, wherein validating comprises:

comparing with well-log data.

18. A method according to claim 15, wherein validating comprises:

comparing with flow data.

19. A method according to claim 15, wherein validating comprises:

performing a geophysical simulation.

20. A computer-implemented method for managing geological hypotheses, comprising:

providing a user-interface for creating hypotheses;

hierarchically organizing hypotheses into a plurality of tree-like structures;

reorganizing said tree-like structures in accordance with user directions; and, maintaining hierarchical, internal consistency among said hypotheses.

21. A method according to claim 20, wherein hierarchically organizing into a plurality of tree-like structures comprises organizing hypotheses such that every hypothesis is either a root hypothesis or a sub-hypothesis of another hypothesis, the parent hypothesis.

22. A method according to claim 21, wherein each sub-hypothesis contains all of the information of its parent hypothesis, plus addition information.

23. A method according to claim 20, wherein creating a hypothesis comprises identifying the depositional system in a specified interval.

24. A method according to claim 20, wherein creating a hypothesis comprises interpreting the stratigraphic sequence in a specified interval.

25. A method according to claim 20, wherein reorganizing comprises deleting one or more hypotheses.

26. A method according to claim 20, wherein reorganizing comprises reassigning one or more links between hypotheses and sub-hypotheses.

27. A method according to claim 20, wherein maintaining hierarchical, internal consistency comprises:

ensuring that, for every hypothesis/sub-hypothesis pair, information contained in the sub-hypothesis is not logically inconsistent with information contained in the hypothesis.

28. A method of providing information for creation of a geological model of a selected region, comprising:

selectively displaying:

geographical data corresponding to the selected region;

geophysical data corresponding to the selected region; and, archive data corresponding to other region(s); and then transforming selected said archive data based on selected said geographical or geophysical data to provide information for creation of a geological model of the selected region.

29. A method according to claim 28, wherein geographical data comprises aerial photographs.

30. A method according to claim 28, wherein geographical data comprises 2-D outcrop photographs.

31. A method according to claim 28, wherein geographical data comprises 3-D outcrop textures.

32. A method according to claim 28, wherein geographical data comprises cultural or political boundaries.

33. A method according to claim 28, wherein geophysical data comprises seismic data.

34. A method according to claim 28, wherein geophysical data comprises textural logs.

35. A method according to claim 28, wherein geophysical data comprises well logs.

36. A method according to claim 28, wherein geographical data comprises core photos.

37. A method according to claim 28, wherein geographical data comprises thin sections.

38. A method according to claim 28, wherein geophysical data comprises a vertical seismic profile.

39. A method according to claim 28, wherein geophysical data comprises ground-penetrating radar data.

40. A method according to claim 28, wherein archive data comprises surfaces.

41. A method according to claim 28, wherein archive data comprises core photos.

42. A method according to claim 28, wherein archive data comprises aerial photographs.

43. A method according to claim 28, wherein archive data comprises thin sections.

44. A method according to claim 28, wherein archive data comprises facies descriptions.

45. A method according to claim 28, wherein archive data comprises biostratigraphy.

46. A method according to claim 28, wherein archive data comprises paleogeography.

47. A method according to claim 28, wherein archive data comprises outcrop photos.

48. A method according to claim 28, wherein archive data comprises geometries.

49. A method according to claim 28, wherein archive data comprises closed-form bodies.

* * * * *